United States Patent
Schwerdtner et al.

(10) Patent No.: US 7,204,556 B2
(45) Date of Patent: Apr. 17, 2007

(54) VEHICLE SEAT

(75) Inventors: Christina Schwerdtner, Neustadt (DE); Peter Rausch, Coburg (DE); Wolfgang Suck, Coburg (DE)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 0 days.

(21) Appl. No.: 10/416,939

(22) PCT Filed: Nov. 9, 2001

(86) PCT No.: PCT/DE01/04244

§ 371 (c)(1),
(2), (4) Date: Sep. 29, 2003

(87) PCT Pub. No.: WO02/40312

PCT Pub. Date: May 23, 2002

(65) Prior Publication Data

US 2004/0066079 A1 Apr. 8, 2004

(30) Foreign Application Priority Data

Nov. 15, 2000 (DE) .................... 100 57 723

(51) Int. Cl.
*B60N 2/02* (2006.01)
(52) U.S. Cl. .................... 297/378.12; 297/378.1; 297/354.1
(58) Field of Classification Search .......... 297/378.1, 297/378.11, 378.14, 378.12, 301.1, 301.5, 297/301.7, 354.12, 361.1, 378.13, 363, 366, 297/376, 354.1

See application file for complete search history.

(56) References Cited

U.S. PATENT DOCUMENTS 1,703,969 A * 5/1929 Syvrud .................... 16/357
1,765,394 A * 6/1930 Atwood .................. 297/378.1

(Continued)

FOREIGN PATENT DOCUMENTS

DE 197 15 764 A1 10/1998

(Continued)

OTHER PUBLICATIONS

International Search Report of PCT/DE01/04244, dated May 10, 2002.

(Continued)

*Primary Examiner*—Peter M. Cuomo
*Assistant Examiner*—Erika Garrett
(74) *Attorney, Agent, or Firm*—Christie, Parker & Hale, LLP

(57) ABSTRACT

A vehicle seat includes a seat underframe and a backrest which tips forwards, these being interconnected by an adjustment and tipping axle and which preferably has a backrest inclination adjustment device on both sides. The adjustment device containing an adjustment gear and a part whose angle is adjustable in relation to a side part of the seat underframe. In the use position of the backrest, a stop of the part with an adjustable angle rests on a first stop of a fitting which is fixed in relation to the backrest, while in the tipped-forward position of the backrest, a stop that is provided on a fitting on the seat side rests on a second stop of the fitting that is fixed in relation to the backrest and/or the backrest upholstery rests on the seat cushion.

15 Claims, 3 Drawing Sheets

U.S. PATENT DOCUMENTS

| | | | | |
|---|---|---|---|---|
| 4,169,626 | A | * | 10/1979 | Hollar, Jr. ................... 297/365 |
| 4,322,112 | A | * | 3/1982 | Berghaus et al. ........... 297/362 |
| 4,457,557 | A | * | 7/1984 | Une ........................... 297/362 |
| 4,629,250 | A | * | 12/1986 | Tezuka et al. .............. 297/362 |
| 4,919,482 | A | * | 4/1990 | Landis et al. .......... 297/378.11 |
| 5,725,279 | A | * | 3/1998 | Ward et al. ............... 297/378.1 |
| 5,730,495 | A | * | 3/1998 | Tuman, II ................... 297/331 |
| 5,904,403 | A | * | 5/1999 | Unckrich ............... 297/378.12 |
| 6,015,190 | A | * | 1/2000 | Wend ..................... 297/378.1 |
| 6,023,994 | A | * | 2/2000 | Yoshida ........................ 74/530 |
| 6,113,190 | A | * | 9/2000 | Negi et al. ............... 297/378.1 |
| 6,164,723 | A | * | 12/2000 | Ganot ................... 297/378.12 |
| 6,209,955 | B1 | * | 4/2001 | Seibold ................. 297/216.13 |
| 6,353,970 | B1 | * | 3/2002 | Spaeth ........................ 16/360 |
| 6,561,584 | B1 | * | 5/2003 | Schwarz et al. ............ 297/367 |

FOREIGN PATENT DOCUMENTS

| | | |
|---|---|---|
| EP | 0 800 952 A1 | 10/1997 |
| EP | 0 878 344 A2 | 11/1998 |
| FR | 2 391 873 | 12/1978 |
| FR | 2 691 681 A1 | 12/1993 |
| FR | 2 779 689 A1 | 12/1999 |
| JP | 53114120 A * | 10/1978 |
| WO | WO 98/25785 | 6/1998 |
| WO | WO 00/55002 | 9/2000 |

OTHER PUBLICATIONS

International Preliminary Examination Report of PCT/DE01/04244, dated Mar. 25, 2003.

English translation of International Preliminary Examination Report (IPER) for International Application PCT/DE01/04244 filed Nov. 9, 2001.

* cited by examiner

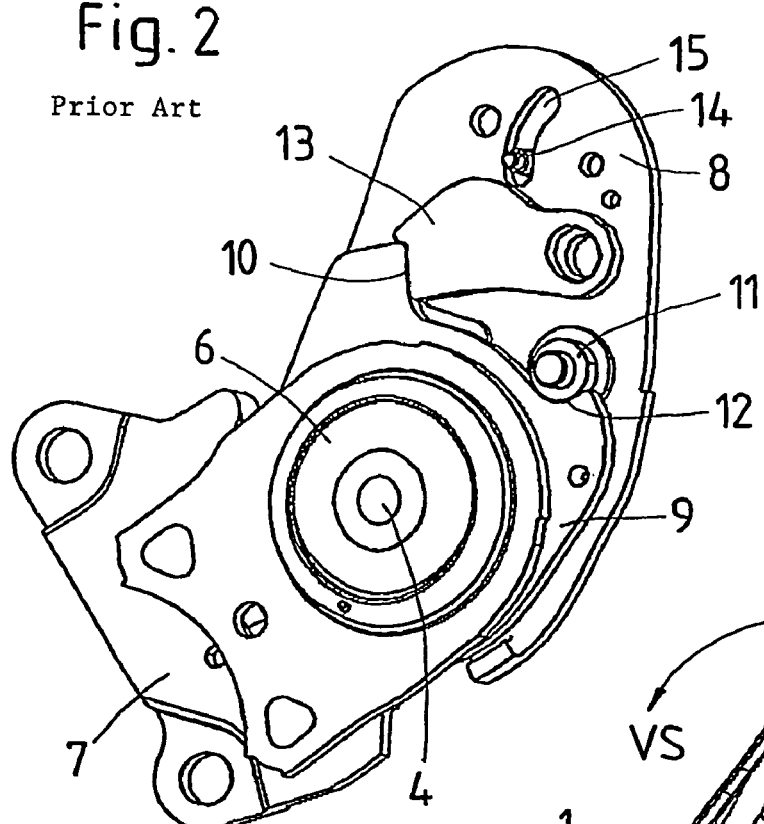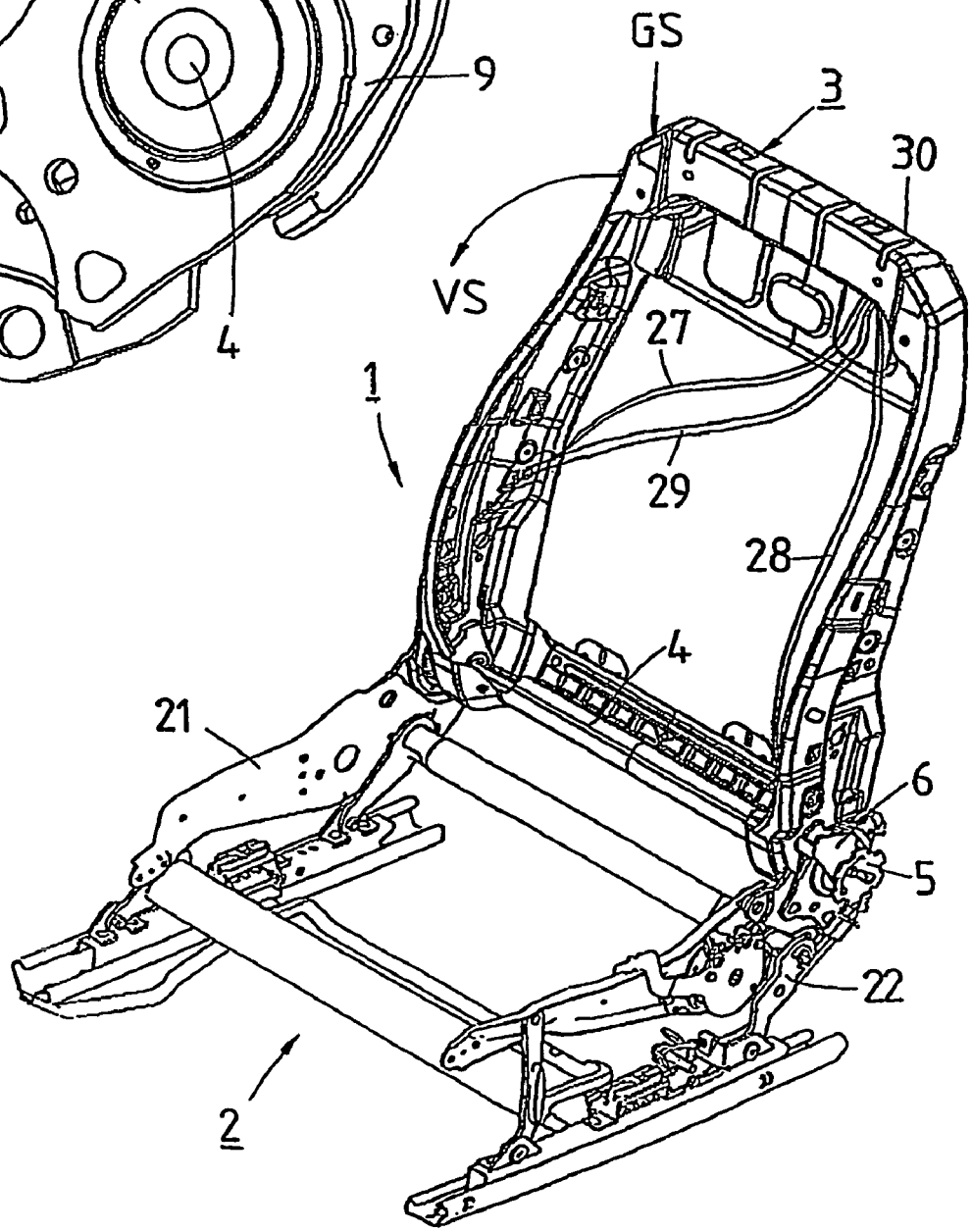

VEHICLE SEAT

CROSS-REFERENCE TO RELATED APPLICATION

This application is a National Phase Patent Application of International Application Number PCT/DE01/04244, filed on Nov. 9, 2001, which claims priority of German Patent Application Number 100 57 723.7, filed Nov. 15, 2000.

FIELD OF THE INVENTION

The invention relates to a vehicle seat.

BACKGROUND

In order to optimize the posture of the vehicle passenger, more particularly the vehicle driver of a motor vehicle, it is known to make the vehicle seat longitudinally adjustable and the underframe of the seat vertically and incline adjustable and to make the incline of the backrest of the vehicle seat adjustable relative to the seat underframe or seat cushion. For a two or three door vehicle it is further known to make the backrest capable of tipping forward so that the backrest cushion comes to rest on the seat cushion, thus facilitating entry for a rear seat passenger by providing the largest possible entry opening.

In the in use position of the vehicle seat, i.e. in the optimum inclined position of the backrest relative to the seat underframe, the incline adjustment of the backrest can be locked in order to prevent rattling noises and in the event of a crash to prevent the backrest from folding forwards. In order to further improve comfort when climbing into the back of the vehicle, it is also known to lock the forward-folded backrest in a predetermined position in order to prevent the backrest, which is resting with its seat back cushion on the seat cushion, from springing back and thus reducing the access opening.

FIG. 1 shows in a perspective view a vehicle seat 1 without seat cushion and backrest cushion. The seat underframe 2 has on either side of the vehicle seat 1 seat side parts 21, 22 which are connected to a backrest 3 through a common adjusting and tipping axle 4. In order to adjust the backrest incline, a hand wheel 5 connected to an adjusting gear 6 is provided on one side of the vehicle seat 1.

The vehicle seat 1 which is shown in an in use position GS in FIG. 1 can be released from the locked in use position GS by means of an operating handle 30 which is located preferably on the side or top edge of the backrest 3 next to the vehicle door. The operating handle 30 is preferably mounted at the back of the backrest. The vehicle seat can be swivelled about the adjusting and tipping axle 4 into a forward folded position VS in which the backrest 3 can be locked.

FIG. 2 shows a perspective view of an adjusting mechanism according to the prior art for a backrest which can be adjusted in incline and folded over.

The adjusting mechanism consists of a fitting 7 fixed on the seat side part and a fitting 8 fixed on the backrest which can be adjusted in angle relative to the fitting 7 about the adjusting and tipping axle 4. In order to adjust the incline of the fitting 8 fixed on the backrest relative to the fitting 7, there is an adjusting gear 6 which is connected to an angularly displaceable part 9 which has two stops 10, 12 aligned relative to each other. The stop 12 on the angularly adjustable part 9 engages a stop 11, which is mounted on the fitting 8, to establish a set in use position GS of the backrest 3. The stop 10 of the angularly adjustable part 9 secures the in use position GS according to FIG. 1 in connection with a pawl 13 which is sprung in the locking position. Unlocking the in use position GS of the vehicle seat is achieved through an operating element 14 which is guided in a slide guide 15 whereby the pawl 13 can be lifted against spring force.

After releasing the stop 10 of the angularly adjustable part 9 by lifting the pawl 13, the fitting 8 and thus the backrest 3 itself can be tipped forward into the forward folded position VS until the stop 11 of the fitting 8 strikes against the stop 10 of the angularly adjustable part 9. Thus the backrest can only be tipped over in the narrow area which lies between the in use position GS in which the stop 11 of the fitting 8 bears against the stop 12 of the angularly adjustable part 9 and the position in which the stop 11 of the fitting 8 stops against the stop 10 of the angularly adjustable part 9.

If in the in use position GS the incline angle formed between the backrest 3 and seat underframe 2 is very large then it is apparent from the aforesaid illustration that as a result of the restricted tipping angle, when folding the backrest 3 forward into the forward folded position VS, there is still a considerable angle of the backrest 3 remaining relative to the seat underframe 2. Thus, the backrest 3 does not reach the desired forward folded position for an optimal easy entry opening for rear seat passengers. Further, a locking mechanism provided for locking the backrest 3 in the forward folded position VS cannot be activated when the backrest 3 does not reach the desired forward folded position.

SUMMARY

The object of the present invention is to provide a vehicle seat with a backrest which can be adjusted in incline and which can be tipped forward whereby folding the backrest over into a predetermined and preferably lockable position is guaranteed independently of the inclined position of the seat backrest in the in use position.

The solution according to the invention enables the backrest to be tipped forward into a predetermined and in particular lockable forward folded position independently of the incline angle of the backrest which has been set in the in use position.

The solution according to the invention is based on the knowledge that the desired forward folded position of a backrest of a vehicle seat can be provided independently of the backrest incline in the in use position through stops provided independently of each other on the fittings fixed on the backrest and on the seat side part as well as on the angularly adjustable part of the adjusting mechanism. Eliminating the dependence of the forward folded position on the in use position makes it possible, even with a wide set backrest incline, i.e. with a wide angle set between the backrest and the seat underframe, to set a predetermined forward folded position in which the position of the backrest can be locked so that the backrest is prevented from springing back.

The idea on which the invention is based will now be described in further detail with reference to an embodiment illustrated in the drawings in which:

FIG. 1 shows a perspective view of a vehicle seat with a backrest which can be adjusted in incline and tipped over;

FIG. 2 shows an adjusting mechanism according to the prior art;

Figure 4:
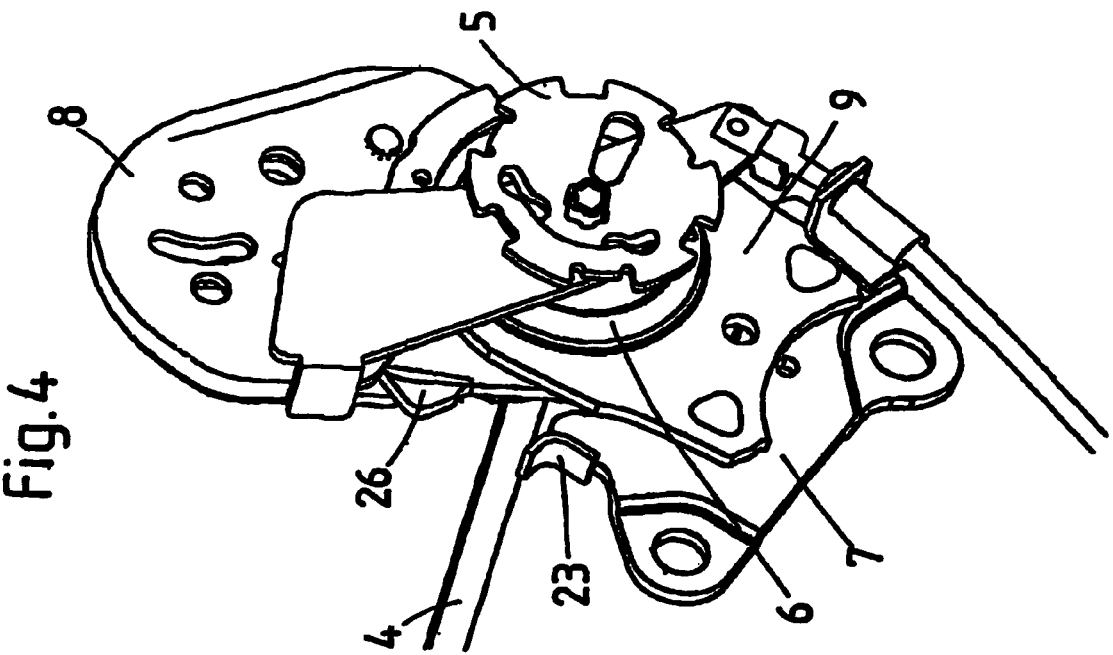
Figure 3:
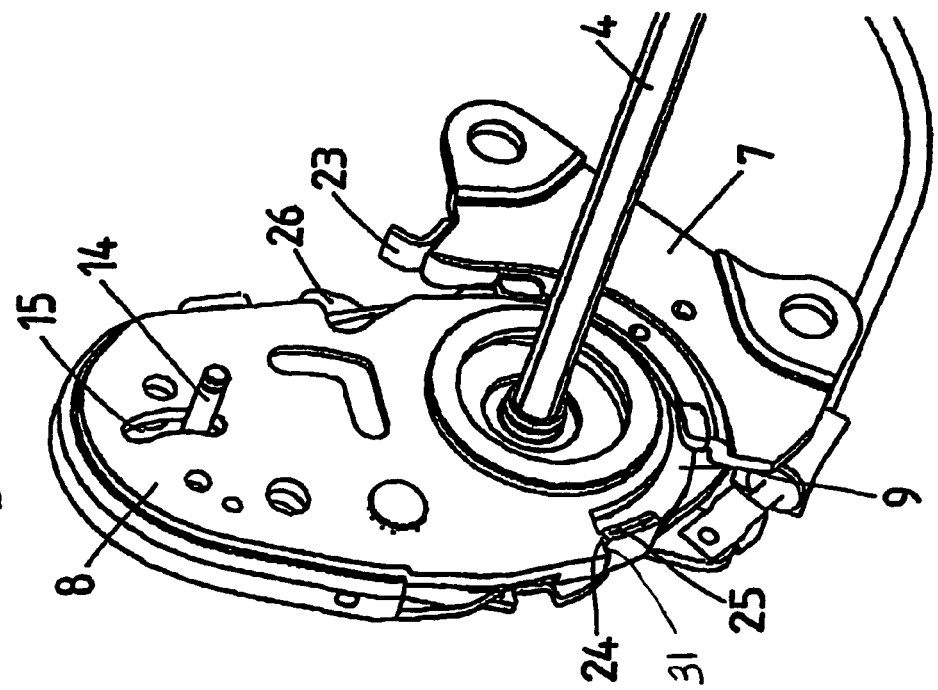
Figure 6:
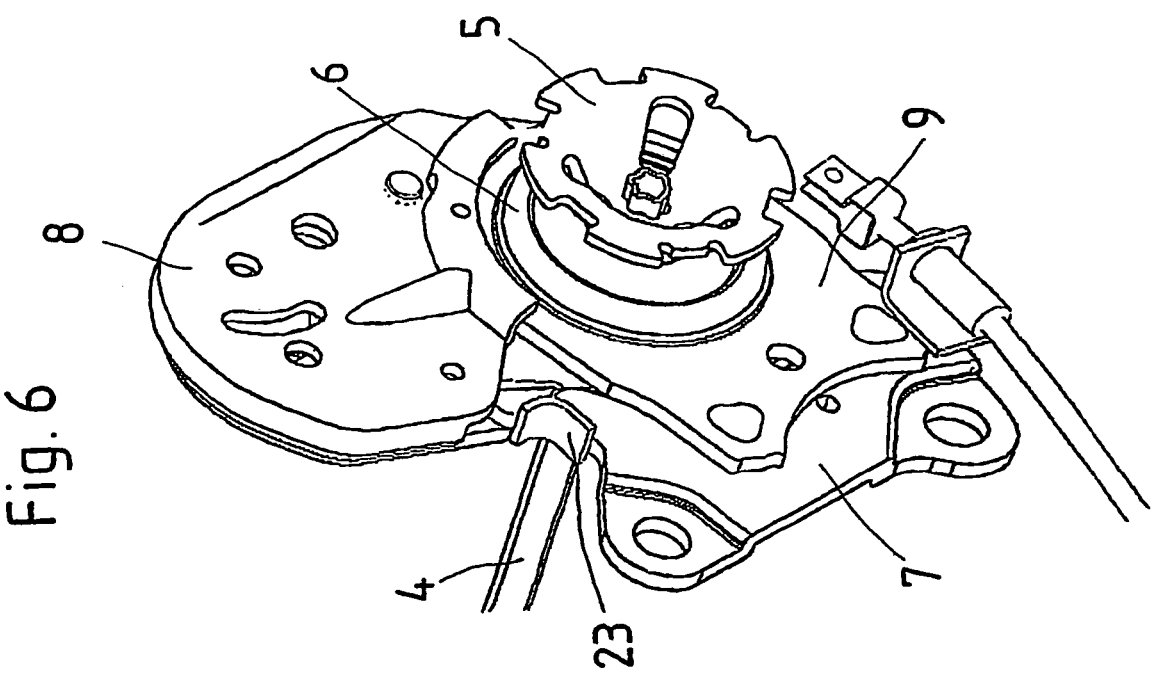
Figure 5:
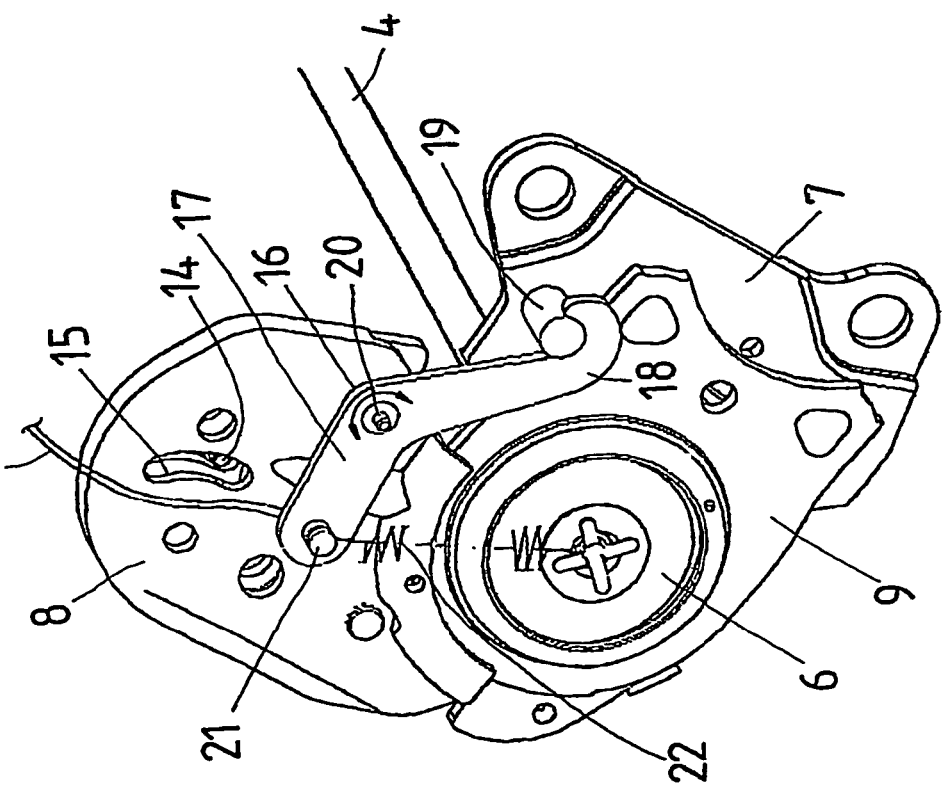

FIGS. 3 and 4 each show a perspective view of the adjusting mechanism according to the invention with the backrest of a vehicle seat located in the in use position; and FIGS. 5 and 6 each show a perspective view of the adjusting mechanism according to the invention with the backrest tipped forward and locked.

FIGS. 3 and 4 on the one hand and 5 and 6 on the other each show the alternate sides of the adjusting mechanism attached to the vehicle seat for adjusting the backrest incline in the in use position and for tipping the backrest forward into the forward-folded position.

FIGS. 3 and 4 show the angularly adjustable connection of a fitting 8 fixed on the backrest to a fitting 7, which is fixed to the seat side parts 21, 22 of the seat underframe 2 according to FIG. 1. This connection is achieved through an adjusting and tipping axle 4. Adjusting the backrest incline is carried out by a hand wheel 5, which acts through an adjusting gear 6 on an angularly adjustable part 9. A stop 25, which is located on the angularly adjustable part 9 and can be adjusted in the directions of the double arrow shown on the stop 25, interacts with a first stop 24 on the fitting 8 to set the relevant incline of the backrest. When tipping the backrest to the forward-tipped position, a stop edge 31 of the first stop 24 is directed away from the seat underframe.

As opposed to the prior art, the stops 23, 26 on the fitting 7 and on the fitting 8 define the forward-tipped position of the backrest and are separated from the stops 24, 25, which define the backrest incline in the in use position. Thus any angle can be provided between the backrest incline in the in use position according to FIGS. 3 and 4 and the backrest incline in the forward-tipped position according to FIGS. 5 and 6.

Since the stop 25 of the angularly adjustable part 9 can only enter into engagement with the associated first stop 24 on the fitting 8 in one direction, namely when tipping the backrest back into the in use position, while when tipping the backrest forward the stop 23 provided on the fitting 7 enters into engagement with the second stop 26 on the fitting 8, and both pairs of stops 24, 25 and 23, 26 are provided on different sides relative to the adjusting and tipping axle 4, tipping the backrest forwards is guaranteed independently of the in use position.

Alternatively the stop 23 provided on the fitting 7 can be replaced by the seat cushion connected to the seat underframe 2 onto which the backrest upholstery of the backrest is pressed. The forward folded position is shown in FIGS. 5 and 6. According to FIG. 6, the stop 23 mounted on the fitting 7 bears against the second stop 26 of the fitting 8 and the position of the fitting 8 and thus of the backrest is fixed by means of a locking mechanism and can only be released by operating the operating handle 30 according to FIG. 1 in order to swivel the backrest 3 back into the in use position.

The locking mechanism contains a locking lever 16 which is able to swivel on an axle 20 in the direction of the double arrow shown in FIG. 5. The axle 20 is connected to the fitting 8. The one lever arm 17 of the locking lever 16 is connected to a Bowden cable 29 and to a spring 22, which is mounted and fixed between a pin 21 located at the end of the lever arm 17 and the axle of the adjusting gear 6, while the other lever arm 18 can be locked with a bolt 19 which is fixed on the fitting 7 on the seat side part. On reaching the predetermined forward folded or tipped position of the backrest the lever arm 18 of the locking lever 16 engages round the bolt 19 with positive engagement so that the backrest is secured by means of the spring elastically pretensioned locking lever 16.

Releasing this locked position is achieved by operating the operating handle 30 according to FIG. 1 which acts through the Bowden cable 29 on the lever arm 17 of the locking lever 16 and which lifts against the action of the spring 22 and terminates the positive engagement between the end of the lever arm 18 and the bolt 19.

In general the in use position of a forward folded backrest is released through an operating handle 30 mounted in the upper area of the backrest whereby Bowden cables 27, 28 or operating rods for locking mechanisms on the operating handle 30 are fitted on both sides of the vehicle seat. The Bowden cable 29 which is provided for the locking lever 16 is likewise fitted on the designated operating handle 30 which according to FIG. 1 is mounted while preferably concealed on the back of the backrest 3.

Securing the backrest incline in the in use position is undertaken by a pawl (not shown in further detail in FIGS. 3 to 6) corresponding to the pawl 13 shown in FIG. 2 which can be operated through an operating element 14 guided in a slide guide 15.

As opposed to the prior art the inwardly pointing stop 12 of the angularly adjustable part 9 according to FIG. 2 has thus been replaced by an outward pointing stop 24 on the fitting 8 according to FIG. 3, and the stop 11 on the fitting 8 fixed on the backrest according to FIG. 2 has been replaced by the stop 25 on the angularly adjustable part 9 according to FIG. 3. The stops 24, 25 defining the incline angle of the backrest in the in use position are separated and are mounted on different sides of the adjusting and tipping axle 4 through which the backrest is attached to the seat underframe.

The invention claimed is:

1. A vehicle seat comprising a seat underframe and a forward-tipping backrest which are connected together through an adjusting and tipping axle; a backrest incline adjusting device containing an adjusting gear and an angularly adjustable part whose angle can be adjusted relative to a side part of the seat underframe; an adjustable part stop of the angularly adjustable part; a first stop of a backrest fitting on the backrest; a side part stop provided on a side part fitting on the seat side part of the seat underframe; a second stop fixedly and nonrotatably attached to the backrest fitting;

in an in use position of the backrest, the adjustable part stop of the angularly adjustable part bears against the first stop of the backrest fitting fixed on the backrest, and in a forward-tipped position of the backrest, at least one of (a) the side part stop provided on the side part fitting on the seat side part of the seat underframe bears against the second stop fixedly and nonrotatably attached to the backrest fitting, and (b) backrest upholstery rests on a seat cushion;

wherein the adjustable part stop of the angularly adjustable part and the first stop of the backrest fitting are mounted on one side of the adjusting and tipping axle and the side part stop provided on the side part fitting as well as the second stop on the back rest fitting are arranged on an opposite side of the adjusting and tipping axle.

2. A vehicle seat according to claim 1 wherein the first stop of the backrest fitting is formed as a stop edge on the backrest fitting and in relation to the adjusting and tipping axle is directed away from the seat underframe when folding the backrest forward.

3. A vehicle seat according to at least one of the preceding claims wherein the backrest can be locked in the in use position by means of a pawl which is sprung in the locking direction.

4. A vehicle seat according to claim 3 wherein the pawl is connected to an operating element which is guided in a slide guide and which is connected to an operating handle through a Bowden cable.

5. A vehicle seat according to claim 1 wherein the backrest is secured in the forward-tipped position into a predetermined position by means of an elastically pretensioned locking element.

6. A vehicle seat according to claim 5 wherein the locking element includes a locking lever having two lever arms which extend on either side of an axle mounted on the backrest fitting, about which axle the locking lever is able to swivel, wherein one lever arm is connected to a Bowden cable, thus connecting the locking lever to an operating handle, and the other lever arm is connectable with keyed engagement to a catch element which is mounted on the side part fitting.

7. A vehicle seat according to claim 6 wherein the catch element mounted on the side part fitting includes a bolt protruding from the fitting on the side part of the seat underframe and the other lever arm of the locking lever engages around the bolt in the locking position.

8. A vehicle seat according to claim 6 wherein the backrest can be locked in the in use position by means of a pawl which is sprung in the locking direction wherein, the locking lever and the bolt are each mounted on one side of the vehicle seat.

9. A vehicle seat according to claim 8 wherein both the locking lever and the bolt are connected through Bowden cables to an operating handle which is mounted on a back of the backrest in the region of its upper edge.

10. A vehicle seat according to claim 1 wherein the backrest incline adjusting device is provided on both sides of the vehicle seat.

11. A vehicle seat according to claim 1 wherein in the forward-tipped position, the backrest upholstery rests on the seat cushion.

12. A vehicle seat according to claim 1 wherein in the forward-tipped position, the side part stop bears against the second stop of the backrest fitting.

13. A vehicle seat according to claim 1 wherein in the forward-tipped position, the backrest upholstery rests on the seat cushion and the side part stop bears against the second stop of the backrest fitting.

14. A vehicle seat comprising a seat underframe and a forward-tipping backrest which are connected together through an adjusting and tipping axle; a backrest incline adjusting device containing an adjusting gear and an angularly adjustable part whose angle can be adjusted relative to a side part of the seat underframe;

in an in use position of the backrest, an adjustable part stop of the angularly adjustable part bears against a first stop of a backrest fitting fixed on the backrest;

and in a forward-tipped position of the backrest, at least one of (a) a side part stop provided on a side part fitting on the side part of the seat underframe bears against a second stop fixedly and nonrotatably attached to the backrest fitting, and (b) backrest upholstery rests on a seat cushion;

wherein the backrest is secured in the forward-tipped position into a predetermined position by means of an elastically pretensioned locking element; and wherein the locking element includes a locking lever having two lever arms which extend on either side of an axle mounted on the backrest fitting, about which axle the locking lever is able to swivel, wherein one lever arm is connected to a Bowden cable, thus connecting the locking lever to an operating handle, and the other lever arm is connectable with keyed engagement to a catch element which is mounted on the side part fitting.

15. A vehicle seat comprising a seat underframe and a forward-tipping backrest which are connected together through an adjusting and tipping axle; a backrest incline adjusting device containing an adjusting gear and an angularly adjustable part whose angle can be adjusted relative to a side part of the seat underframe; an adjustable part stop of the angularly adjustable part; a first stop of a backrest fitting on the backrest; a side part stop provided on a side part fitting on the seat side part of the seat underframe; a second stop fixedly and nonrotatably attached to the backrest fitting;

in an in use position of the backrest, the adjustable part stop of the angularly adjustable part bears against the first stop of the backrest fitting fixed on the backrest, and in a forward-tipped position of the backrest, at least one of (a) the side part stop provided on the side part fitting on the seat side part of the seat underframe bears against the second stop fixedly and nonrotatably attached to the backrest fitting, and (b) backrest upholstery rests on a seat cushion;

wherein the backrest is secured in the forward-tipped position into a predetermined position by means of in elastically pretensioned locking element.

* * * * *

UNITED STATES PATENT AND TRADEMARK OFFICE
CERTIFICATE OF CORRECTION

PATENT NO.        : 7,204,556 B2
APPLICATION NO. : 10/416939
DATED             : April 17, 2007
INVENTOR(S)       : Schwerdtner et al.

It is certified that error appears in the above-identified patent and that said Letters Patent is hereby corrected as shown below:

On the Title Page

Item (57) Abstract, line 2          Delete "forwards",
                                    Insert --forward--

In the Claims

Column 6, line 43, Claim 15         Delete "means of in",
                                    Insert --means of an--

Signed and Sealed this

Twenty-seventh Day of November, 2007

JON W. DUDAS
*Director of the United States Patent and Trademark Office*